Jan. 27, 1925.
W. F. DORAN
HEADLIGHT
Filed Feb. 27, 1923
1,524,293
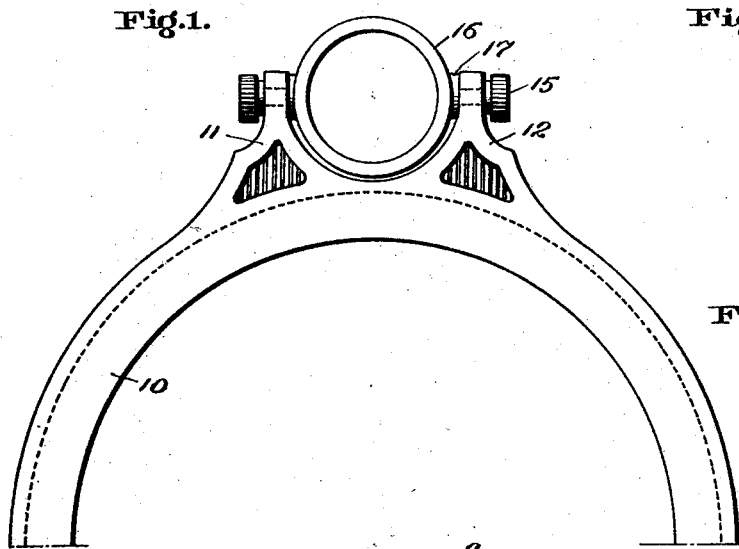
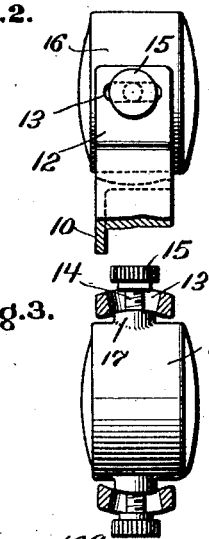
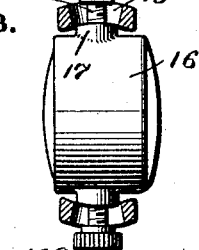
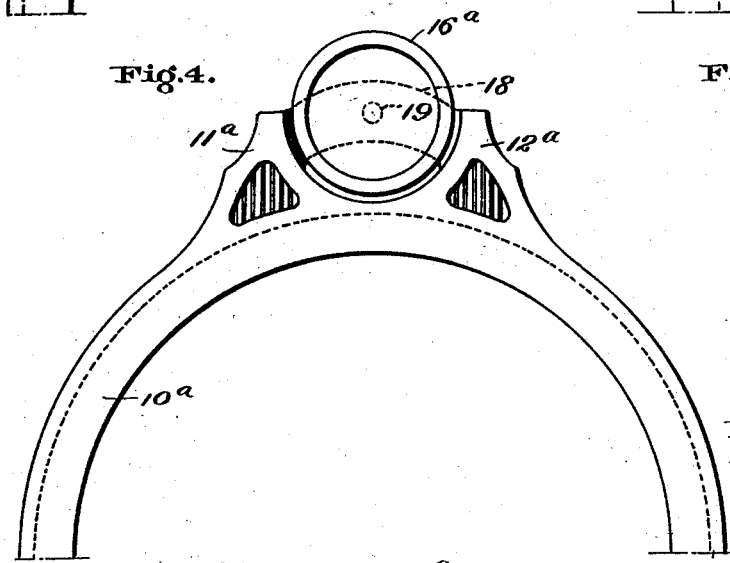
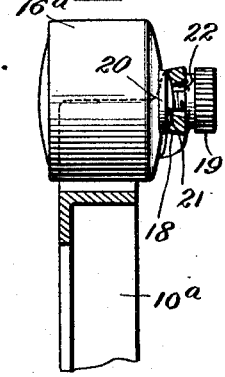
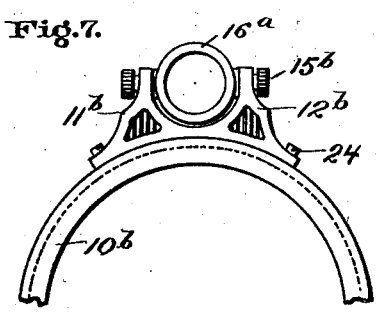
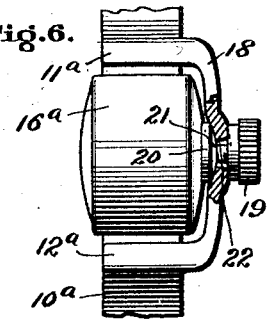
Inventor:
William F. Doran,
by Alfred E. Baker
His Attorney.

Patented Jan. 27, 1925.

1,524,293

UNITED STATES PATENT OFFICE.

WILLIAM F. DORAN, OF PHILADELPHIA, PENNSYLVANIA.

HEADLIGHT.

Application filed February 27, 1923. Serial No. 621,653.

*To all whom it may concern:*

Be it known that I, WILLIAM F. DORAN, a citizen of the United States, residing at Philadelphia, in the county of Philadelphia, State of Pennsylvania, have invented certain new and useful Improvements in Headlights, of which the following is a specification.

The present invention relates to headlights such as are used on automobiles. Usually the headlights furnished on an automobile comprise a single casing containing a reflector and a lens held over the front of the casing by a rim or frame, which is readily removable to give access to the lamp. It is often desirable from the standpoint of both utility and appearance to provide in addition to the regular headlights small lights located directly adjacent them which may serve as parking lights or as running lights for use on city streets which are well lighted at night by street lights.

The primary object of my invention is to provide an improved structure and arrangement whereby an ordinary headlight may be converted into a headlight of the type having a main larger headlight and a smaller parking light directly adjacent it; or in other words, to provide an improved arrangement whereby a small parking light may be attached to or made to form a part of an ordinary headlight so as to convert it into a headlight structure of the type comprising a main headlight and an adjacent smaller parking light.

A further object of my invention is to provide an arrangement which enables the ordinary headlight to be converted at a low cost into one embodying a parking light and without employing the services of a skilled workman.

A further object of my invention is to provide an arrangement wherein the additional smaller light will be firmly attached to the main light so there will be no parts to rattle, or come loose.

For a consideration of what I believe to be novel and my invention, attention is directed to the following description and the claims appended thereto.

In the drawing, Fig. 1 is a front view of a structure embodying my invention, the lower half of the rim being omitted; Fig. 2 is a side elevation of the upper portion of the structure; Fig. 3 is a top plan view showing an adjusting means in section; Fig. 4 is a view similar to Fig. 1 of a modification; Fig. 5 is a vertical sectional view of the arrangement shown in Fig. 4, the lamp casing being shown in elevation; Fig. 6 is a top plan view partly in section of the arrangement shown in Fig. 4; and Fig. 7 is a view similar to Fig. 1 of a further modification.

Referring to the drawing, Figs. 1, 2 and 3, 10 indicates a rim for a headlight which rim may be used to replace the ordinary rim of a headlight, such as is furnished as regular equipment on an automobile. Rim 10 may have such dimensions and be provided with such fastening means as is found desirable for any particular automobile or any particular type of headlight lamp. Carried by rim 10 is a supporting means which in the present instance is in the form of a curved yoke having two arms 11 and 12. In Figs. 1, 2 and 3, arms 11 and 12 are formed integral with rim 10 and are given a shape or contour so as to present a pleasing appearance to the eye. They are quite wide at the bottoms where they blend into the rim and into each other, which serves to give strength to the structure, at the same time provide a pleasing shape. The free or outer ends of the arms 11 and 12 are curved, as shown in Fig. 3, the center of curvature lying midway between the arms, and are provided with elongated transverse slots 13 in which are located fastening screws 14 provided with knurled heads 15. Located between arms 11 and 12 is a small supplemental headlight 16 provided on opposite sides with bosses 17 which have tapped openings to receive screws 14. Bosses 17 are curved to conform to the curvature of the ends of arms 11 and 12 and fit nicely between the arms. Supplemental headlight 16 may be of any suitable structure and may have any suitable arrangement of lens, reflector, etc., as found desirable. As is clear from the drawing, it is supported between arms 11 and 12 by screws 14. By turning screws 14 up tight the supplemental headlight is held rigidly in position.

In use when it is desired to convert an ordinary headlight into one embodying a parking light, the usual rim, that is, the rim originally provided with the main or ordinary headlight, is removed and replaced by rim 10 which carries the supplemental headlight. The supplemental headlight is then wired to the lighting system of the automobile in any suitable manner. Usually wires will extend from it to a switch adjacent the driver's seat so the light may be turned on and off at will.

By loosening screws 14 headlight 16 can be adjusted in a horizontal plane, the screws moving in slots 13, or it can be adjusted in a vertical plane by turning it on the screws as an axis. Then by tightening the screws again it can be fixed in any desired adjusted position. The arrangement is preferably such that the curved outer faces of bosses 17 fit nicely the curved surfaces of arms 11 and 12 so that there will be no play between these parts. The curved surfaces give a good contact of substantial area so that when the screws are tightened the headlight is held very firmly.

In Figs. 4, 5 and 6, I have shown a modification wherein arms 11$^a$ and 12$^a$ corresponding to arms 11 and 12 of Figs. 1 to 3, are connected by a bar 18 to which the headlight 16$^a$ is fastened by a screw 19. In these figures the rim is indicated 10$^a$. Headlight 16$^a$ has a boss 20 provided with a curved surface which engages a curved surface 21 on bar 18. The opening 22 in bar 18 through which screw 19 passes is made sufficiently large to permit of the desired amount of adjustment of the headlight.

In Fig. 7 I have shown a further modification wherein the yoke which carries the headlight indicated at 16$^b$ instead of being formed integral with the rim is formed separate therefrom and fastened to the rim by screws 24. Otherwise the arrangement in Fig. 7 is similar to that of Figs. 1, 2 and 3, and similar parts are designated by the same reference numeral with the exponent "b" added.

The arrangements shown in Figs. 4 to 7. inclusive, are used after the same manner as already described in connection with Figs. 1, 2 and 3.

While I have described my invention for use in replacing the ordinary rim of a headlight, it will be understood that it is not necessarily limited to use in this way but may be used as original equipment on headlight casings.

A structure embodying my invention may be made in various styles and sizes to adapt it to different types and sizes of headlights and the fastening means may be modified accordingly. The various arrangements are simple in structure, neat in appearance, and can be manufactured at a low cost. In addition the device is easily installed on a headlight.

In accordance with the provisions of the patent statutes, I have described the principle of operation of my invention, together with apparatus which I now consider to represent the best embodiments thereof; but I desire to have it understood that the apparatus shown is only illustrative, and that the invention may be carried out by such other means as come within the scope of the appended claims.

What I claim as new and desire to secure by Letters Patent of the United States, is:—

1. As an article of manufacture, a rim adapted to replace the ordinary rim of a headlight, supporting arms carried by and attached to said rim, and a supplemental headlight adjustably mounted on said arms.

2. As an article of manufacture, a rim for a headlight, supporting arms carried by and attached to said rim, said arms having curved outer ends provided with enlarged openings, screws in said openings, and a supplemental headlight carried by said screws.

3. A headlight rim provided with a supporting yoke having a wall with a curved supporting surface, said wall having an opening therein, a supplemental headlight having a curved surface for engagement with the first mentioned curved surface, and a member which projects through said opening for fastening said supplemental headlight in the yoke.

In witness whereof, I have hereunto set my hand this 21 day of February, 1923.

WILLIAM F. DORAN.